US009760180B2

(12) United States Patent
Nagai et al.

(10) Patent No.: US 9,760,180 B2
(45) Date of Patent: Sep. 12, 2017

(54) USER INTERFACE DEVICE AND USER INTERFACE METHOD

(71) Applicant: NEC Solution Innovators, Ltd., Koto-ku, Tokyo (JP)

(72) Inventors: Katsuyuki Nagai, Tokyo (JP); Koji Morishita, Tokyo (JP); Hisashi Noda, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 23 days.

(21) Appl. No.: 14/433,456

(22) PCT Filed: Jun. 20, 2013

(86) PCT No.: PCT/JP2013/066941
§ 371 (c)(1),
(2) Date: Apr. 3, 2015

(87) PCT Pub. No.: WO2014/054317
PCT Pub. Date: Apr. 10, 2014

(65) Prior Publication Data
US 2015/0268735 A1    Sep. 24, 2015

(30) Foreign Application Priority Data

Oct. 5, 2012    (JP) ................................ 2012-222884

(51) Int. Cl.
*G09G 5/00*    (2006.01)
*G06F 3/01*    (2006.01)
(Continued)

(52) U.S. Cl.
CPC .............. *G06F 3/017* (2013.01); *G06F 3/011* (2013.01); *G06F 3/0304* (2013.01); *G06F 3/038* (2013.01);
(Continued)

(58) Field of Classification Search
CPC ........ G06F 3/011; G06F 3/017; G06F 3/0304; G06F 3/038; G06F 3/04815; G02B 2027/0178; G06K 9/00355
(Continued)

(56) References Cited

U.S. PATENT DOCUMENTS 7,359,547 B2 * 4/2008 Noto ....................... G06T 7/586
345/419
7,743,348 B2 * 6/2010 Robbins ................ G06F 3/0421
715/767
(Continued)

FOREIGN PATENT DOCUMENTS

CN    1501325 A    6/2004
CN    102385478 A    3/2012
(Continued)

OTHER PUBLICATIONS

International Search Report for PCT Application No. PCT/JP2013/066941, mailed on Sep. 3, 2013.
(Continued)

*Primary Examiner* — Vijay Shankar

(57) ABSTRACT

A user interface device having: an acquisition unit that sequentially acquires pointing positions indicating at least one representative position of a specific region of a user used in a pointing operation; a detection unit that detects the start of a change and the end of the change into a predetermined shape of the specific region of the user; a storage unit that stores a pointing position corresponding to the time of the start of the change detected by the detection unit; a calculation unit that specifies a pointing position corresponding to the time of the end of the change detected by the detection unit and calculates a difference between the specified pointing position and the pointing position stored in the storage unit; and a position adjustment unit that adjusts the pointing
(Continued)

positions acquired by the acquisition unit using the difference calculated by the calculation unit.

9 Claims, 12 Drawing Sheets

(51) Int. Cl.
    *G06F 3/03*     (2006.01)
    *G06F 3/038*     (2013.01)
    *G06F 3/0481*     (2013.01)
    *G06K 9/00*     (2006.01)
    *G02B 27/01*     (2006.01)

(52) U.S. Cl.
    CPC ..... *G06F 3/04815* (2013.01); *G06K 9/00355* (2013.01); *G02B 2027/0178* (2013.01)

(58) Field of Classification Search
    USPC .................................. 345/156–168, 173–178
    See application file for complete search history.

(56) References Cited

U.S. PATENT DOCUMENTS

| | | | |
|---|---|---|---|
| 7,830,334 B2* | 11/2010 | Takemoto | G06T 19/006 345/7 |
| 7,880,726 B2* | 2/2011 | Nakadaira | G06F 3/03545 345/156 |
| 8,780,075 B2* | 7/2014 | Yamano | G06F 3/0236 345/174 |
| 2004/0041822 A1* | 3/2004 | Iizuka | G06T 15/005 345/634 |
| 2004/0057613 A1 | 3/2004 | Noto et al. | |
| 2005/0024388 A1 | 2/2005 | Takemoto | |
| 2008/0225007 A1* | 9/2008 | Nakadaira | G06F 3/04815 345/173 |
| 2008/0231926 A1* | 9/2008 | Klug | H04N 13/0425 359/23 |
| 2010/0073366 A1* | 3/2010 | Tateno | G06T 17/20 345/419 |
| 2012/0056848 A1 | 3/2012 | Yamano et al. | |

FOREIGN PATENT DOCUMENTS

| | | |
|---|---|---|
| JP | 2003-337962 A | 11/2003 |
| JP | 2010-522380 A | 7/2010 |
| JP | 2012-137989 A | 7/2012 |
| WO | 2006/041097 A1 | 4/2006 |
| WO | 2011/158605 A1 | 12/2011 |

OTHER PUBLICATIONS

Chinese Office Action for CN Application No. 201380052301.2 issued on Nov. 30, 2016 with English Translation.

* cited by examiner

USER INTERFACE DEVICE AND USER INTERFACE METHOD

This application is a National Stage Entry of PCT/JP2013/066941 filed on Jul. 20, 2013, which claims priority from Japanese Patent Application 2012-222884 filed on Oct. 5, 2012, the contents of all of which are incorporated herein by reference, in their entirety.

TECHNICAL FIELD

The present invention relates to a user interface technology.

BACKGROUND ART

As a user interface (man-machine interface) device that enables a user input with respect to a computer, various apparatuses such as a mouse, a joystick, a trackball, and a touch panel, have been provided. In recent years, a user interface device that enables a user input in response to a body movement by detecting the body movement (gesture), such as a data glove, a data suit, or the like, has been also developed. A user can operate a computer with an intuitive feel by such a user interface device.

For example, in PTL 1 described below, a technology that facilitates an operation input by a user's gesture is proposed. By the proposed technology, based on resolution of a distance sensor, three-dimensional display performance of a display, and a measurement distance of an instruction point such as a finger of the user's hand in the depth direction, a parameter for determining sensitivity of detecting a movement of the instruction point in the depth direction is adjusted. Then, by calculating the distance of the instruction point in the depth direction based on the adjusted parameter, the operation input by the user's gesture is recognized.

CITATION LIST

Patent Literature

[PTL 1] Japanese Unexamined Patent Application Publication No. 2012-137989

SUMMARY OF INVENTION

Technical Problem

However, the above-described proposed method merely assumes the user input corresponding to the movement of a specific part (instruction point) of the body, such as a finger of the hand, and does not assume a user input corresponding to a change of a shape (status) of a specific region of a user used in a pointing operation, such as a movement of grabbing an object with a hand and a movement of holding an object with a finger.

The present invention has been made in view of these circumstances, and provides a user interface technology that intuitively and simply operates a computer by a gesture including a change of a shape of a specific region of a user.

Solution to Problem

In order to solve the above-described problem, aspects of the present invention adopt the following configurations.

A first aspect relates to a user interface device. The user interface device according to the first aspect includes a position acquisition unit that sequentially acquires pointing positions indicating at least one representative position of a specific region of a user used in a pointing operation, a change detection unit that detects the start of a change and the end of the change into a predetermined shape of the specific region of the user, a position storage unit that stores a pointing position corresponding to the time of the start of the change detected by the change detection unit among the pointing positions sequentially acquired by the position acquisition unit, a calculation unit that specifies a pointing position corresponding to the time of the end of the change detected by the change detection unit among the pointing positions acquired by the position acquisition unit and calculates a difference between the specified pointing position and the pointing position stored in the position storage unit, and a position adjustment unit that adjusts the pointing positions acquired by the position acquisition unit using the difference calculated by the calculation unit.

A second aspect relates to a user interface method. In the user interface method according to the second aspect, at least one computer sequentially acquires pointing positions indicating at least one representative position of a specific region of a user used in a pointing operation, detects the start of a change and the end of the change into a predetermined shape of the specific region of the user, stores a pointing position corresponding to the time of the detected start of the change among the sequentially acquired pointing positions, specifies a pointing position corresponding to the time of the detected end of the change among the sequentially acquired pointing positions, calculates a difference between the specified pointing position and the stored pointing position, and adjusts the sequentially acquired pointing positions using the calculated difference.

It is to be noted that other aspects may be a program that makes at least one computer implement the respective configurations in the above first aspect, or a computer-readable recording medium that records such a program. The recording medium includes a non-transitory tangible medium.

Advantageous Effects of Invention

According to the above-described respective aspects, a user interface technology that intuitively and simply operates a computer by a gesture including a change of a shape of a specific region of a user can be provided.

BRIEF DESCRIPTION OF DRAWINGS

The above-described object and other objects, features, and advantages will be more apparent from preferred exemplary embodiments described below and the following accompanying drawings.

DESCRIPTION OF EMBODIMENTS

Hereinafter, exemplary embodiments of the present invention will be described. It is to be noted that the following respective exemplary embodiments are examples, and the present invention is not limited to configurations of the following respective exemplary embodiments.

A user interface device according to the present exemplary embodiment includes a position acquisition unit that sequentially acquires pointing positions indicating at least one representative position of a specific region of a user used in a pointing operation, a change detection unit that detects the start of a change and the end of the change into a predetermined shape of the specific region of the user, a position storage unit that stores a pointing position corresponding to the time of the start of the change detected by the change detection unit among the pointing positions sequentially acquired by the position acquisition unit, a calculation unit that specifies a pointing position corresponding to the time of the end of the change detected by the change detection unit among the pointing positions acquired by the position acquisition unit and calculates a difference between the specified pointing position and the pointing position stored in the position storage unit, and a position adjustment unit that adjusts the pointing positions acquired by the position acquisition unit using the difference calculated by the calculation unit.

A user interface method by at least one computer, according to the present exemplary embodiment, includes sequentially acquiring pointing positions indicating at least one representative position of a specific region of a user used in a pointing operation, detecting the start of a change and the end of the change into a predetermined shape of the specific region of the user, storing a pointing position corresponding to the time of the detected start of the change among the sequentially acquired pointing positions, specifying a pointing position corresponding to the time of the detected end of the change among the sequentially acquired pointing positions, calculating a difference between the specified pointing position and the stored pointing position, and adjusting the sequentially acquired pointing positions using the calculated difference.

Figure 1:
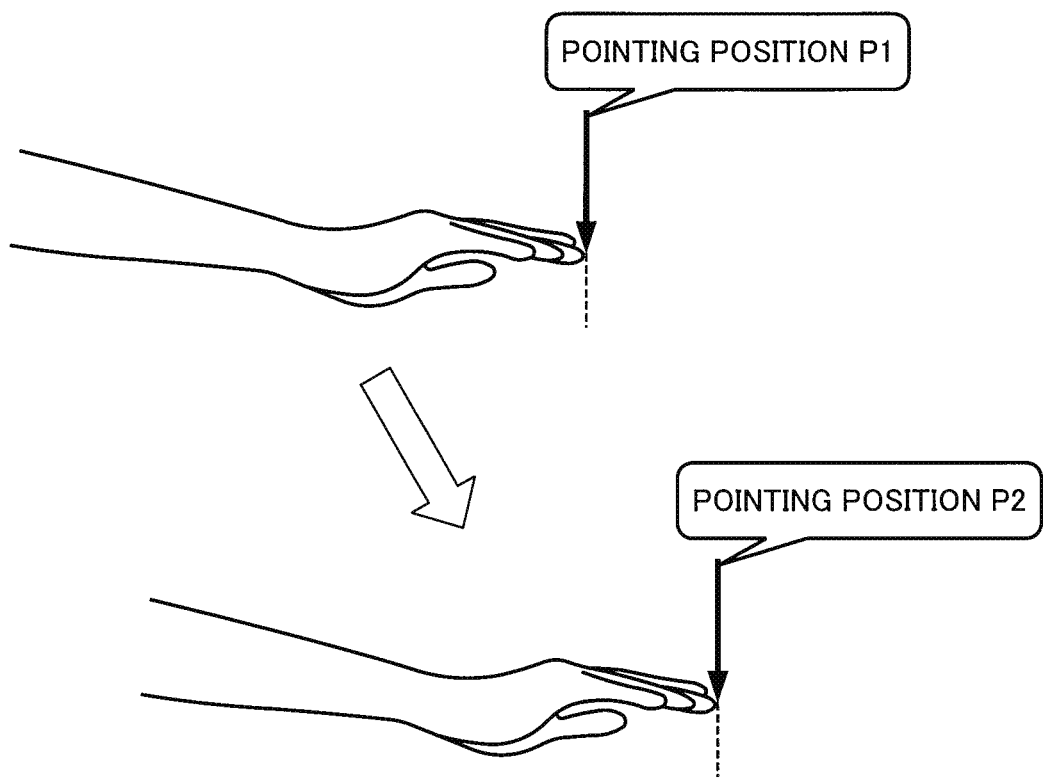
FIG. 1 is a diagram conceptually illustrating acquisition of pointing positions.
Figure 2:
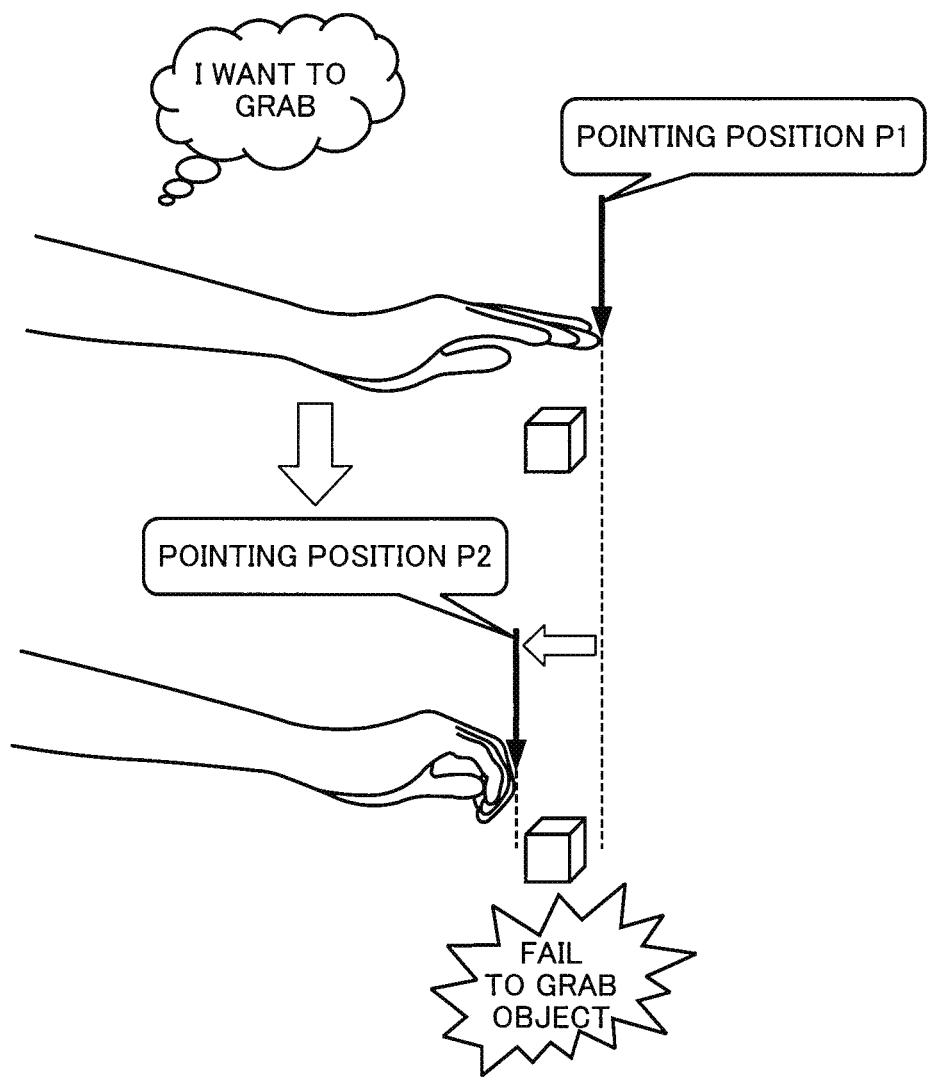
FIG. 2 is a diagram conceptually illustrating a problem with the acquisition of pointing positions.
Figure 3:
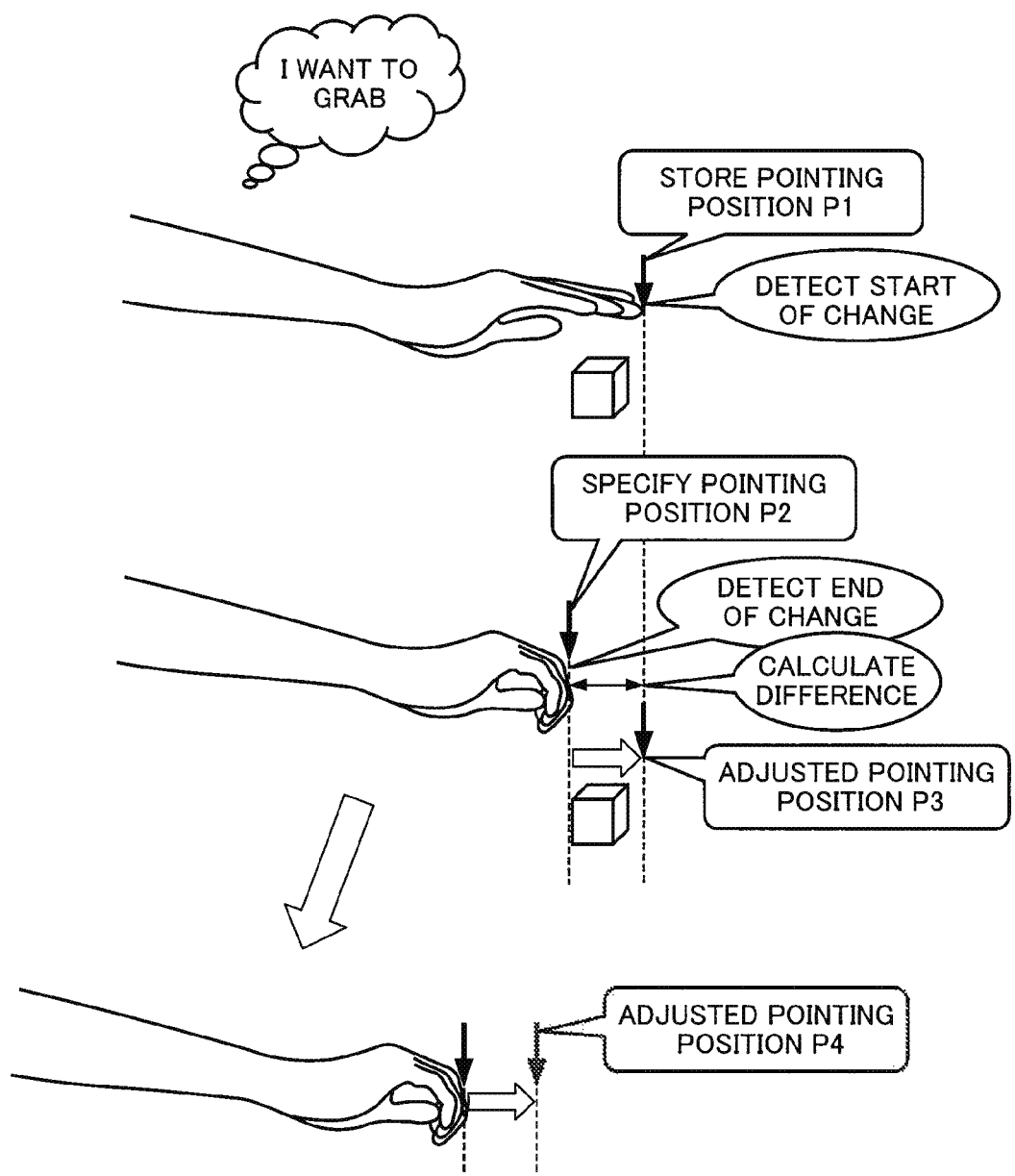
FIG. 3 is a diagram conceptually illustrating adjustment of pointing positions in an exemplary embodiment.

Hereinafter, the function and the effect in the above-described exemplary embodiment will be described using FIG. 1 to FIG. 3. FIG. 1 is a diagram conceptually illustrating acquisition of pointing positions. FIG. 2 is a diagram conceptually illustrating a problem with the acquisition of pointing positions. FIG. 3 is a diagram conceptually illustrating adjustment of pointing positions in the above-described exemplary embodiment.

In the present exemplary embodiment, pointing positions corresponding to the specific region of the user are sequentially acquired. For example, at least one representative position of the specific region of the user is specified as the pointing positions from a two-dimensional image or three-dimensional information (for example, two-dimensional image and depth information) indicating the specific region of the user. More specifically, the pointing positions may be acquired from skeleton information obtained by skeleton tracking of a game controller system called Kinect (registered trademark). In addition, the outer shape of the specific region of the user is recognized, and the pointing positions may be set at the gravity center position obtained from the recognized outer shape. The present exemplary embodiment does not limit a specific method of the pointing positions.

In the examples of FIG. 1 to FIG. 3, a hand is used as the specific region of the user, and a representative one position in the hand, which is at a position farthest from the body, is set as the pointing positions. In addition, in the example of FIG. 1, an entire arm including the hand of the user is moved so that pointing positions P1 and P2 are sequentially acquired.

Detecting a movement to grab an object and using the movement as a user input for a computer will be considered. In FIG. 2, a cube is an object that the user wants to grab, and when a pointing position with respect to the cube is appropriate and a predetermined movement (holding) is recognized, the computer assumes a state where the cube is grabbed by the user. In this case, as illustrated in FIG. 2, the pointing position P1 acquired in a state where the user opens the hand is set at the fingertip of the hand. In this state, when the user holds the hand to grab the object with the hand, a position farthest from the body in the hand in the holding status is acquired as the pointing position P2. In this manner, when a movement (gesture) including a change of a shape of the specific region of the user used in a pointing operation is recognized, the pointing positions corresponding to the specific region may be misaligned before and after the change of the shape. This is not dependent on a determining method of the pointing positions in the specific region of the user. For example, also in the case where the gravity center in the hand as the specific region is set as the pointing position, the gravity center when opening the hand and the gravity center when holding the hand are different in positions, and thus, the pointing positions may be misaligned between both statuses.

The foregoing misalignment of the pointing positions before and after the specific gesture causes a distance between a position of a display object to be an operation object in the specific gesture and a pointing position after the specific gesture, and the specific gesture may be falsely recognized as a user input different from the intended user input. More specifically, the operation with respect to the display object by the specific gesture may be impossible. In this manner, in a user interface in which predetermined processing is performed by a shape change of a specific region of a user and a pointing position can be changed by the shape change, a user's intended movement may not be performed due to the change of the pointing position corresponding to the shape change.

In the present exemplary embodiment, firstly, the start of a change and the end of the change into a predetermined shape of the above-described specific region are detected. The change of the shape of the specific region of the user is detected by, for example, information obtained from a sensor, such as a strain sensor, mounted on a data glove or a data suit. In addition, the change may be made to be detected from a two-dimensional image or three-dimensional information (for example, two-dimensional image and depth information) indicating the specific region of the user. The present exemplary embodiment does not limit a detecting method itself of the change of the shape of the specific region.

For example, in the case where the specific region is a hand, the predetermined shape is a shape of the hand in a state of grabbing an object. The start of the change is detected, for example, when the shape is changed to a predetermined shape direction beyond a predetermined change width stored in advance. In addition, the end of the change is detected, for example, when the specific region of the user becomes the predetermined shape. The end of the change may be made to be detected, for example, when the shape is further changed beyond predetermined change information (strain information) obtained from the sensor in a state where the shape of the specific region becomes the predetermined shape. The end of the change may be made to be detected when the shape change is stopped during predetermined time stored in advance.

In the present exemplary embodiment, as illustrated in FIG. 3, among the sequentially acquired pointing positions, the pointing position P1 corresponding to the time of the start of the change detected by the change detection unit is stored, and furthermore, the pointing position P2 corresponding to the time of the end of the change detected by the change detection unit is specified. Here, the pointing position corresponding to the time of the start of the change means a pointing position acquired when the start of the change is detected by the change detection unit or before and after at the time. The same is true in the pointing position corresponding to the time of the end of the change.

Then, a difference between the pointing position P2 corresponding to the time of the end of the change and the stored pointing position P1 is calculated, and the pointing positions are adjusted using the calculated difference. Accordingly, a pointing position P4 relating to the specific region that has the shape at the time of the end of the change detected by the change detection unit becomes a value obtained by adjusting the pointing positions acquired by the position acquisition unit relating to the specific region having the shape with the difference calculated as described above. In the example of FIG. 3, addition of the difference is used for the adjustment of the pointing positions. In the present exemplary embodiment, the adjustment of the pointing positions does not limit to the addition of the difference, and the adjustment may be performed by adding the difference multiplied by a predetermined coefficient.

As described above, according to the present exemplary embodiment, the pointing position after the time of the end of the change is adjusted, using the misalignment of the pointing positions corresponding to the specific region before and after the change of the shape of the specific region of the user used in a pointing operation. Therefore, according to the present exemplary embodiment, false recognition of a user input due to the misalignment of the pointing positions before and after the specific gesture can be prevented, and as a result, by the gesture including the change of the shape of the specific region of the user, a user interface that intuitively and simply operates a computer can be achieved.

Hereinafter, the further details of the above-described exemplary embodiment will be described. Hereinafter, as detailed exemplary embodiments, a first exemplary embodiment, a second exemplary embodiment, a third exemplary embodiment, and modified examples thereof will be exemplified.

First Exemplary Embodiment

[Device Configuration]

Figure 4:
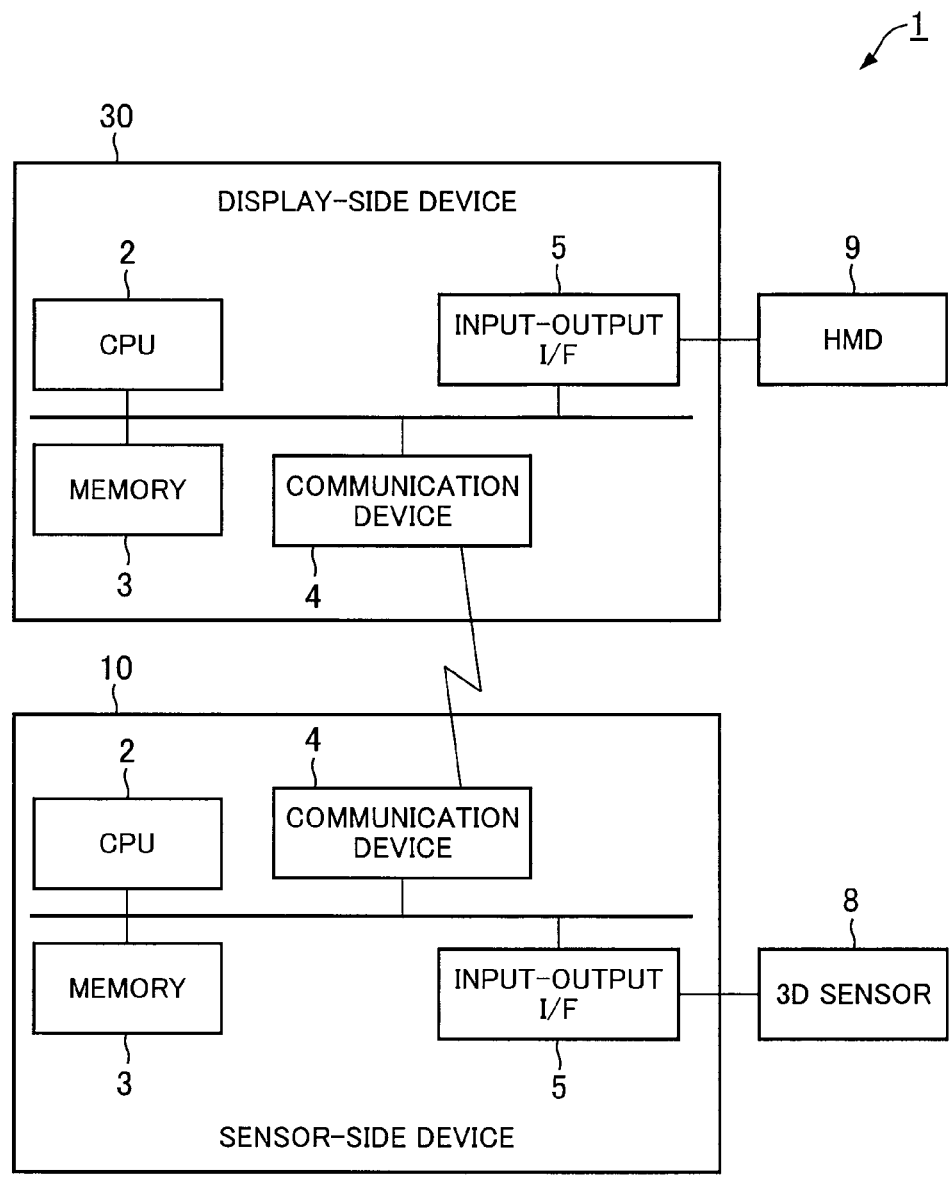
FIG. 4 is a diagram conceptually illustrating a hardware configuration example of a three-dimensional user interface device (3D-UI device) in a first exemplary embodiment.

FIG. 4 is a diagram conceptually illustrating a hardware configuration example of a three-dimensional user interface device (hereinafter, referred to as 3D-UI device) 1 in the first exemplary embodiment. The 3D-UI device 1 in the first exemplary embodiment broadly includes a sensor-side configuration and a display-side configuration. The sensor-side configuration is composed of a three-dimensional sensor (hereinafter, referred to as 3D sensor) 8 and a sensor-side device 10. The display-side configuration is composed of a head-mounted display (hereinafter, referred to as HMD) 9 and a display-side device 30. Hereinafter, three-dimensional is suitably abbreviated to 3D.

Figure 5:
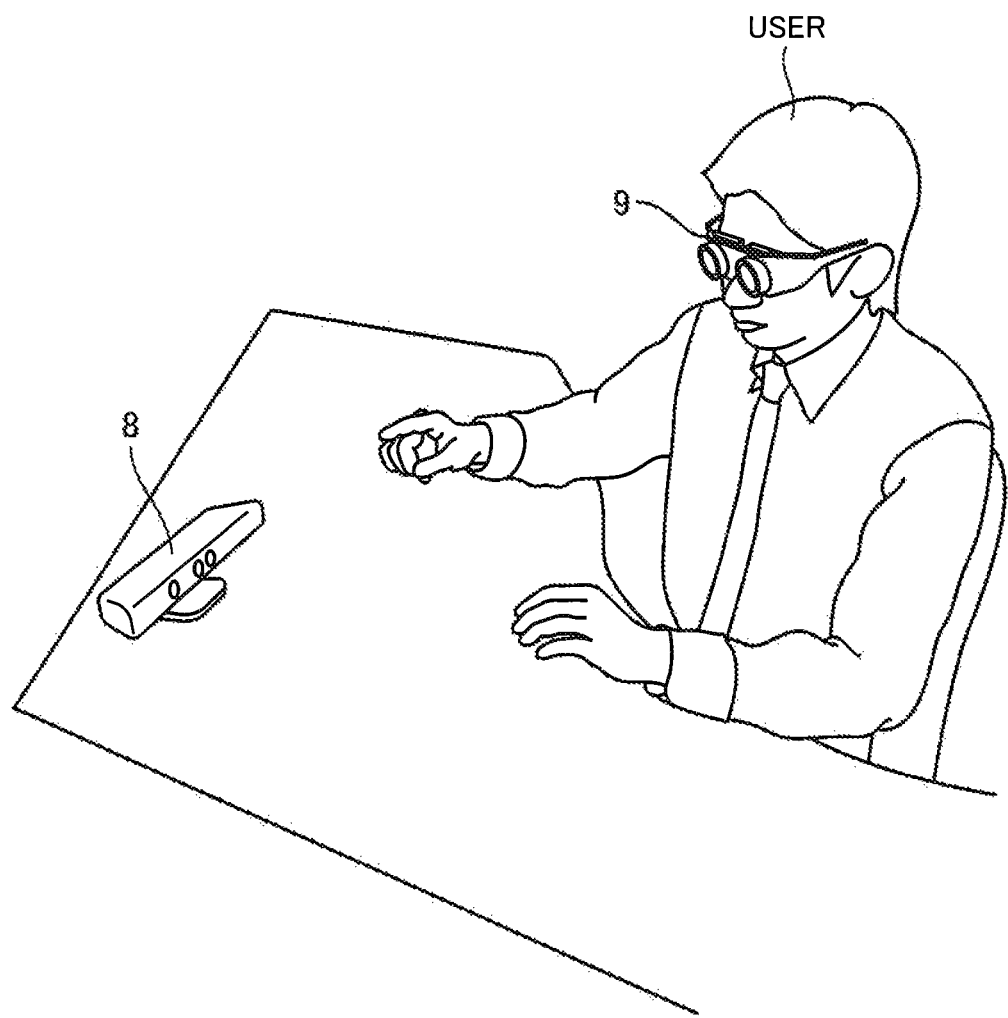
FIG. 5 is a diagram illustrating an example of a utility form of the three-dimensional user interface device (3D-UI device) in the first exemplary embodiment.

FIG. 5 is a diagram illustrating an example of a utility form of the 3D-UI device 1 in the first exemplary embodiment. As illustrated in FIG. 5, the 3D sensor 8 is arranged at a position capable of detecting a specific region of a user. The HMD 9 is mounted on the head of the user and makes the user visually recognize a visual line video corresponding to the visual line of the user and the above-described virtual 3D space that is synthesized in the visual line video.

The 3D sensor 8 detects 3D information that is used for detecting a specific region of a user, and the like. The 3D sensor 8 is achieved by a visible camera and a range image sensor, as in Kinect (registered trademark), for example. The range image sensor is also called a depth sensor, and a distance (depth) between the range image sensor and a user is calculated from information obtained by irradiating the user with a near-infrared light pattern from a laser and imaging the pattern with a camera that detects near-infrared light. It is to be noted that the achieving method of the 3D sensor 8 itself is not limited, and the 3D sensor 8 may be achieved by a three-dimensional scanner method using a plurality of visible cameras. In addition, although the 3D sensor 8 is illustrated by one element in FIG. 4, the 3D sensor 8 may be achieved by a plurality of apparatuses such as a visible camera that images a two-dimensional image of the user and a sensor that detects a distance to the user.

Figure 6:
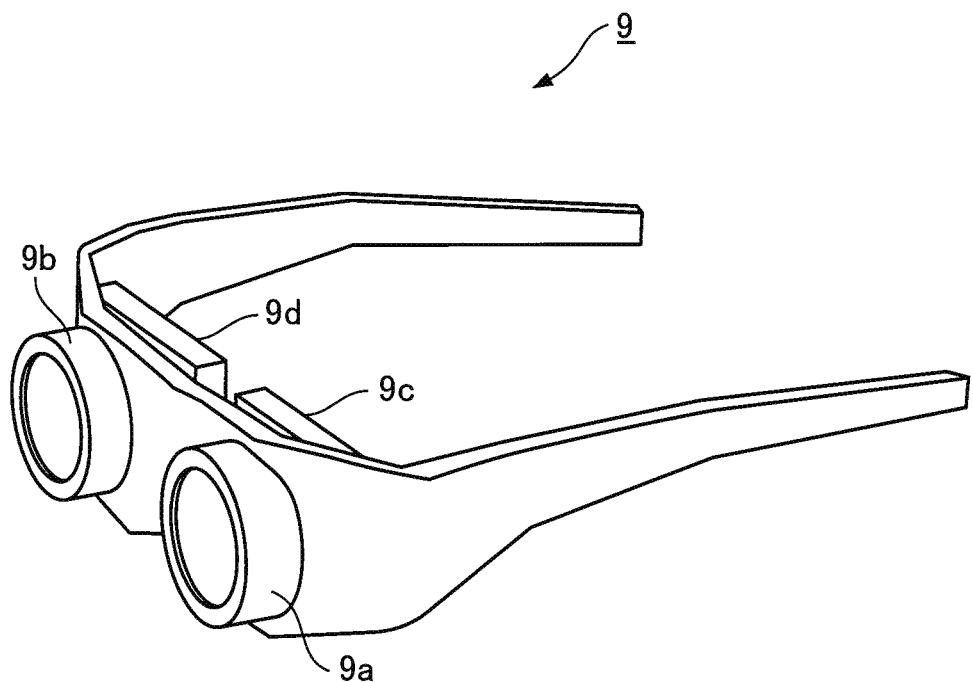
FIG. 6 is a diagram illustrating an example of an external configuration of a HMD.

FIG. 6 is a diagram illustrating an example of an external configuration of the HMD 9. In FIG. 6, the configuration of the HMD 9 called a video see-through type is illustrated. In the example of FIG. 6, the HMD 9 includes two visual line cameras 9a and 9b, and two displays 9c and 9d. Each of the visual line cameras 9a and 9b images each visual line image corresponding to each visual line of the user. Accordingly, the HMD 9 can be called an imaging unit. Each of the displays 9c and 9d is arranged so as to cover a large part of the user's view, and displays a synthetic 3D image obtained by synthesizing a virtual 3D space in each visual line image.

Each of the sensor-side device 10 and the display-side device includes a CPU (Central Processing Unit) 2, a memory 3, a communication device 4, an input-output interface (I/F) 5, and the like, which are mutually connected by a bus, or the like. The memory 3 is a RAM (Random Access Memory), a ROM (Read Only Memory), a hard disk, a portable storage medium, or the like.

The input-output I/F 5 of the sensor-side device 10 is connected to the 3D sensor 8, and the input-output I/F 5 of the display-side device 30 is connected to the HMD 9. In addition, the input-output I/F 5 of the sensor-side device 10 may be connected to a sensor that obtains information of a shape change of a specific region of a user, such as a distortion sensor. The input-output I/F 5 and the 3D sensor 8, and the input-output I/F 5 and the HMD 9 may be communicably connected by wireless. Each of the communication devices 4 performs communication with another device (the sensor-side device 10, the display-side device 30, or the like) by wireless or wire. The present exemplary embodiment does not limit such a form of communication. In addition, specific hardware configurations of the sensor-side device 10 and the display-side device 30 are not limited.

[Functional Configuration]
<Sensor-Side Device>

Figure 7:
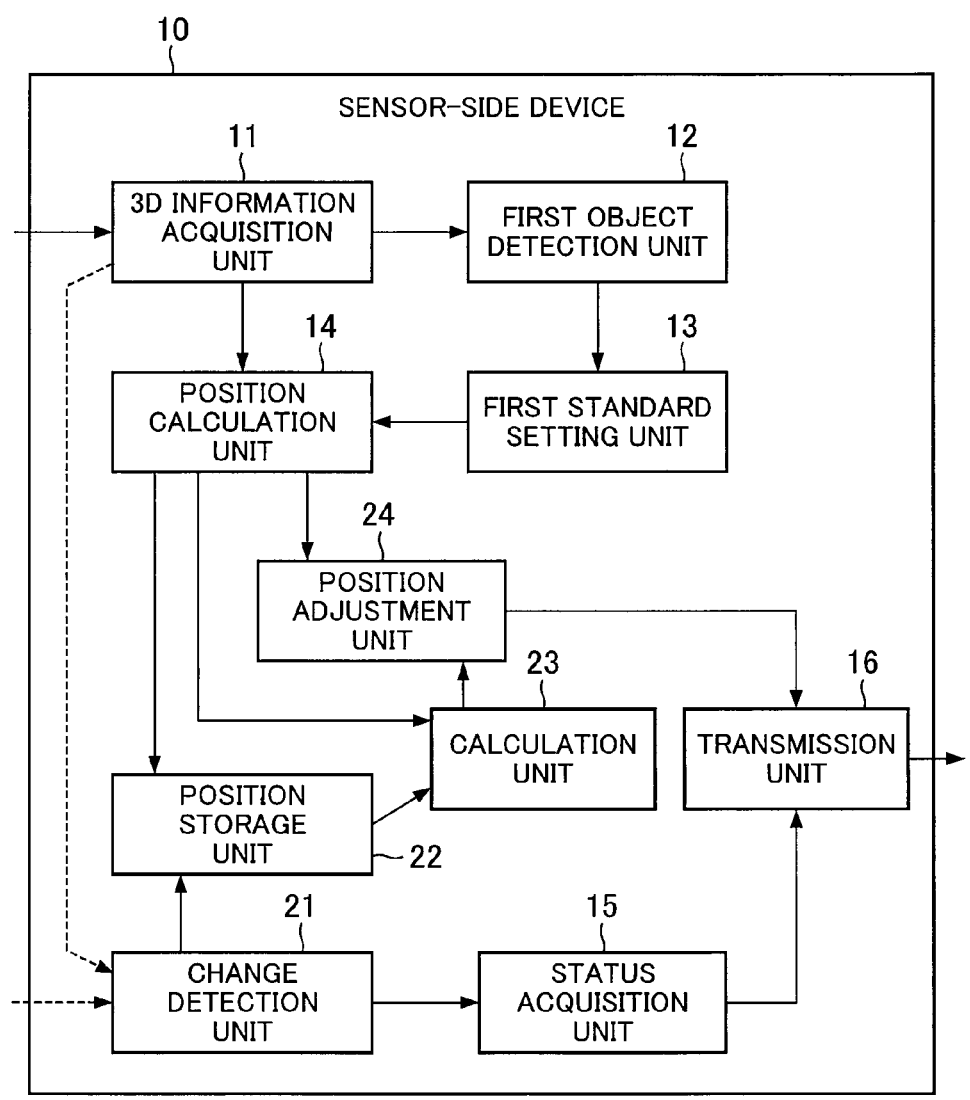
FIG. 7 is a diagram conceptually illustrating a functional configuration example of a sensor-side device in the first exemplary embodiment.

FIG. 7 is a diagram conceptually illustrating a functional configuration example of the sensor-side device 10 in the first exemplary embodiment. The sensor-side device 10 in the first exemplary embodiment includes a 3D information acquisition unit 11, a first object detection unit 12, a first standard setting unit 13, a position calculation unit 14, a status acquisition unit 15, a transmission unit 16, a change detection unit 21, a position storage unit 22, a calculation unit 23, a position adjustment unit 24, and the like. For example, a program stored in the memory 3 is executed by the CPU 2 so that these respective processing units are achieved. In addition, the program may be installed from, for example, portable recording mediums such as a CD (Compact Disc) and a memory card, and another computer on the network, via the input-output I/F 5, and stored in the memory 3.

The 3D information acquisition unit 11 sequentially acquires 3D information detected by the 3D sensor 8. The 3D information includes a two-dimensional image of a user, obtained by visible light, and distance (depth) information from the 3D sensor 8.

The first object detection unit 12 detects a known common real object from the 3D information acquired by the 3D information acquisition unit 11. The common real object is an image or an object arranged in the real world, and is called an AR (Augmented Reality) marker or the like. The present exemplary embodiment does not limit a specific form of the common real object as long as a certain reference point and three directions that are mutually perpendicular from the reference point can be constantly obtained regardless of a reference direction. The first object detection unit 12 stores information about a shape, a size, a color, and the like indicated by the common real object in advance, and detects the common real object from the 3D information, using such known information.

The first standard setting unit 13 sets a 3D coordinate space based on the common real object detected by the first object detection unit 12, and calculates a position and an orientation of the 3D sensor 8 in the 3D coordinate space. For example, the first standard setting unit 13 uses the reference point extracted from the common real object as the origin, and sets the 3D coordinate space using the three directions that are mutually perpendicular from the reference point as respective axes. The first standard setting unit 13 calculates the position and the orientation of the 3D sensor 8 by a comparison between the known shape and size relating to the common real object (corresponds to the original shape and size) and the shape and the size indicated by the common real object, extracted from the 3D information (corresponds to the visibility from the 3D sensor 8).

The position calculation unit 14 sequentially calculates 3D pointing positions in the above-described 3D coordinate space relating to a specific region of a user, using the 3D information sequentially acquired by the 3D information acquisition unit 11. Accordingly, the position calculation unit 14 can also be called a position acquisition unit. In the first exemplary embodiment, specifically, the position calculation unit 14 calculates the 3D pointing positions as follows. Firstly, the position calculation unit 14 extracts 3D pointing positions indicating at least one representative position of a specific region of a user, from the 3D information acquired by the 3D information acquisition unit 11. The extraction of the 3D pointing positions is performed by, for example, the above-described skeleton tracking. The 3D pointing positions extracted here correspond to a camera coordinate system of the 3D sensor 8. The position calculation unit 14 converts the 3D pointing positions corresponding to the camera coordinate system of the 3D sensor 8 into the 3D pointing positions in the 3D coordinate space set by the first standard setting unit 13, based on the position and the orientation of the 3D sensor 8 calculated by the first standard setting unit 13 and the 3D coordinate space. The conversion means conversion from the camera coordinate system of the 3D sensor 8 into a 3D coordinate system set based on the above-described common real object.

There may be a plurality of specific regions of the user which should be detected. For example, there can be the form using both hands of the user as the plurality of specific regions. In this case, the position calculation unit 14 extracts 3D pointing positions of the plurality of specific regions, from the 3D information acquired by the 3D information acquisition unit 11, and converts each of the 3D pointing positions into each of the 3D pointing positions in the 3D coordinate space. In addition, the specific region is a part of the body used by the user to operate a virtual object to be displayed on the displays 9c and 9d of the HMD 9, and thus, has a certain amount of area or volume. Therefore, the 3D pointing positions calculated by the position calculation unit 14 may a position at a certain one point or positions at a plurality of points in the specific regions.

As described in the above-described exemplary embodiment, the change detection unit 21 detects the start of a change and the end of the change into a predetermined shape of the specific region of the user. Furthermore, the change detection unit 21 detects a recovery change of a shape of the specific region of the user, from the above-described predetermined shape to a recovery direction. From the predetermined shape to the recovery direction means a change direction from the shape corresponding to the time of the end of the change (predetermined shape) to the shape corresponding to the time of the start of the change (original shape). The change detection unit 21 acquires distortion (movement) information of the specific region obtained from the sensor such as a distortion sensor, connected to the input-output I/F 5, and detects the start of the change, the end of the change, and the recovery change based on the information. In addition, the change detection unit 21 may detect them from the 3D information indicating the specific region of the user acquired by the 3D information acquisition unit 11. In the case where the end of the change is detected by the stop of the shape change during predetermined time, the recovery change may be detected by the restart of the shape change after detecting the end of the change.

The position storage unit 22 stores a 3D pointing position corresponding to the time of the start of the change detected by the change detection unit 21 among the 3D pointing positions sequentially calculated by the position calculation unit 14. For example, the position storage unit 22 receives notice of the detection of the start of the change from the change detection unit 21, and stores the latest 3D pointing position at the time of being calculated by the position calculation unit 14.

Furthermore, the position storage unit 22 releases the stored 3D pointing position in response to the above-described detection of the recovery change by the change detection unit 21. The release of the 3D pointing position may be achieved by deleting the 3D pointing position, or may be achieved by setting the 3D pointing position to NULL.

The calculation unit 23 specifies a 3D pointing position corresponding to the time of the end of the change detected by the change detection unit 21 among the 3D pointing positions acquired by the position calculation unit 14, and calculates a difference between the specified 3D pointing position and the 3D pointing position stored in the position storage unit 22. For example, the calculation unit 23 receives notice of the detection of the end of the change from the change detection unit 21, and specifies the latest 3D pointing position at the time of being calculated by the position calculation unit 14 as the 3D pointing position corresponding to the time of the end of the change. In addition, the calculation unit 23 calculates a distance in the 3D coordinate space, as the difference. It is to be noted that the calculation unit 23 may calculate a distance of one specific axis in the 3D coordinate space, namely, an axis parallel to the depth direction of the 3D sensor 8, as the difference.

When the 3D pointing position is stored by the position storage unit 22, the calculation unit 23 calculates the above-described difference. When the 3D pointing position is released by the position storage unit 22, the calculation unit 23 may be configured not to perform the calculation of the above-described difference.

The position adjustment unit 24 adjusts the 3D pointing positions sequentially acquired by the position calculation unit 14 using the difference calculated by the calculation unit 23. For example, the position adjustment unit 24 sets a position obtained by adding the difference to the 3D pointing position corresponding to the time of the end of the change, as an adjusted 3D pointing position. The position adjustment unit 24 may be set to add the difference multiplied by a predetermined coefficient.

The position adjustment unit 24 stops the adjustment of the 3D pointing positions in response to the release of the 3D pointing position by the position storage unit 22. Therefore, the position adjustment unit 24 adjusts the respective 3D pointing positions sequentially calculated by the position calculation unit 14, using the difference calculated by the calculation unit 23, between when the end of the change is detected and when the recovery change is detected by the change detection unit 21.

The status acquisition unit 15 specifies a status of the specific region and acquires status information, based on the shape of the specific region of the user detected by the change detection unit 21. For example, the status acquisition unit 15 acquires status information indicating one of at least two, a hand-holding status and a hand-opening status. The present exemplary embodiment does not limit the number of the statuses that can be indicated by the status information in a detectable range. In addition, when the plurality of specific regions are used, the status acquisition unit 15 acquires status information relating to the respective specific regions.

The transmission unit 16 transmits the 3D pointing positions calculated by the position calculation unit 14 or the 3D pointing positions adjusted by the position adjustment unit 24, and the status information acquired by the status acquisition unit 15, relating to the specific region of the user, to the display-side device 30.

<Display-Side Device>

Figure 8:
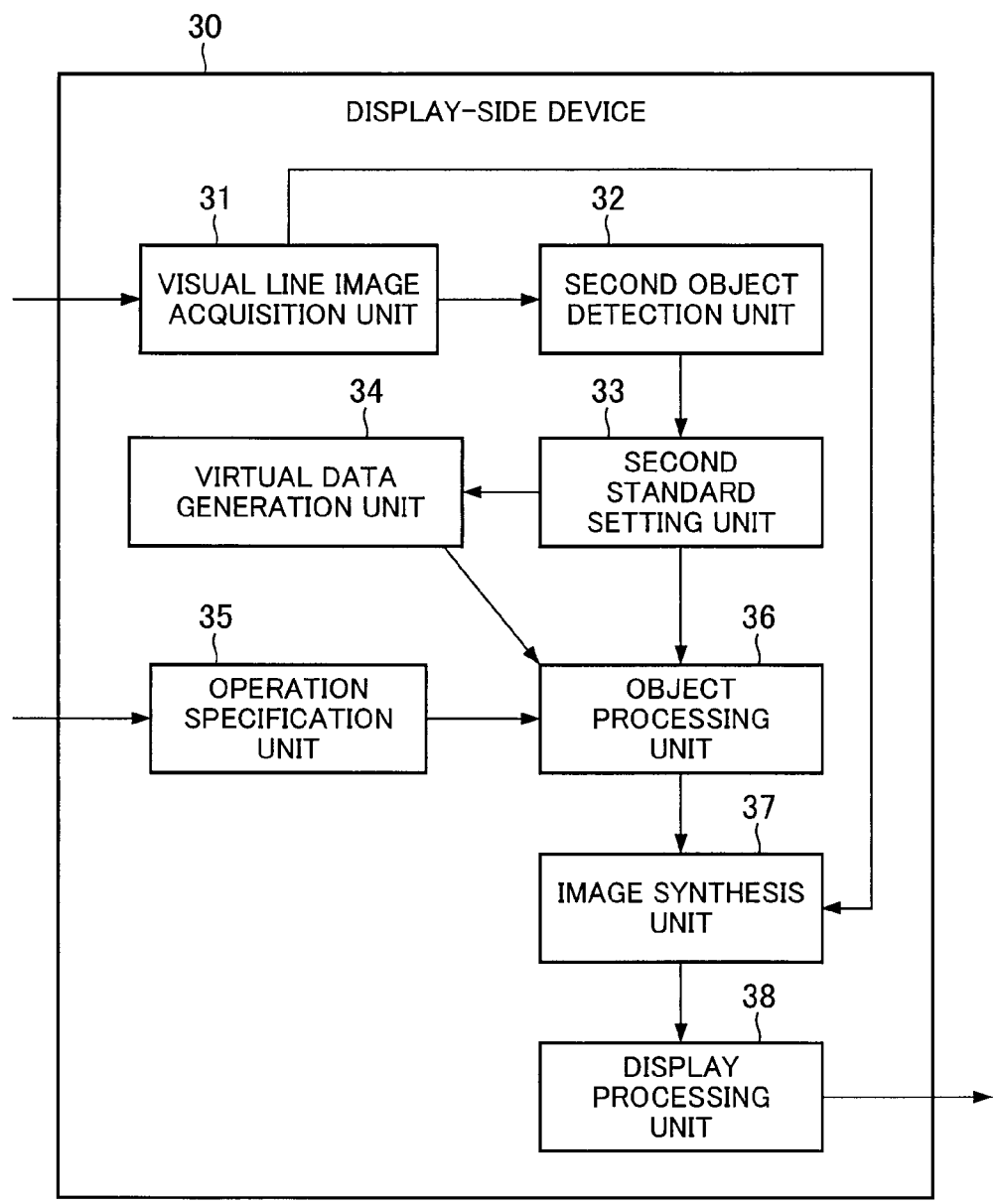
FIG. 8 is a diagram conceptually illustrating a functional configuration example of a display-side device in the first exemplary embodiment.

FIG. 8 is a diagram conceptually illustrating a functional configuration example of the display-side device 30 in the first exemplary embodiment. The display-side device 30 in the first exemplary embodiment includes a visual line image acquisition unit 31, a second object detection unit 32, a second standard setting unit 33, a virtual data generation unit 34, an operation specification unit 35, an object processing unit 36, an image synthesis unit 37, a display processing unit 38, and the like. For example, a program stored in the memory 3 is executed by the CPU 2 so that these respective processing units are achieved. In addition, the program may be installed from, for example, portable recording mediums such as a CD (Compact Disc) and a memory card, and another computer on the network, via the input-output I/F 5, and stored in the memory 3.

The visual line image acquisition unit 31 acquires a visual line image of the user from the HMD 9. The specific region of the user may be photographed in the visual line image. The specific region is also the same as the specific region that is a target to be detected in the sensor-side device 10. In the present exemplary embodiment, since the visual line cameras 9a and 9b are provided, the visual line image acquisition unit 31 acquires visual line images respectively corresponding to the left eye and the right eye. It is to be noted that the respective processing units similarly process the both visual line images corresponding to the left eye and the right eye, and thus, one visual line image will be targeted and described in the following description.

The second object detection unit 32 detects a known common real object from the visual line image acquired by the visual line image acquisition unit 31. The common real object may be the same as the object detected in the above-described sensor-side device 10, or a specific part of the object is used in the sensor-side device 10 and the entirety of the object is used at the side of the HMD 9. Since the processing of the second object detection unit 32 is the same as that of the first object detection unit 12 of the above-described sensor-side device 10, the detailed description is omitted here. It is to be noted that the common real object included in the visual line image is different in an imaging direction from the common real object included in the 3D information acquired in the 3D sensor 8.

The second standard setting unit 33 sets the 3D coordinate space set by the first standard setting unit 13 of the sensor-side device 10, based on the common real object detected by the second object detection unit 32, and calculates a position and an orientation of the HMD 9. Since the processing of the second standard setting unit 33 is also the same as that of the first standard setting unit 13 of the sensor-side device 10, the detailed description is omitted here. The 3D coordinate space set by the second standard setting unit 33 is also set based on the same common real object as the 3D coordinate space set by the first standard setting unit 13 of the sensor-side device 10, and as a result, the 3D coordinate space is shared between the sensor-side device 10 and the display-side device 30.

The virtual data generation unit 34 generates virtual 3D object data arranged in the 3D coordinate space shared with the sensor-side device 10 by the second standard setting unit 33. The virtual data generation unit 34 may generate data of a virtual 3D space in which a virtual 3D object is arranged, with the virtual 3D object data.

The operation specification unit 35 receives the 3D pointing position in the 3D coordinate space and the status information relating to the specific region of the user, from the sensor-side device 10, and specifies one predetermined processing to be executed by the object processing unit 36 from a plurality of pieces of predetermined processing, based on a combination of the status information and a change of the 3D pointing position. The change of the 3D pointing position is calculated from a relationship with the 3D pointing position obtained in the previous processing. In addition, when a plurality of specific regions (for example, both hands) are used, the operation specification unit 35 calculates a positional relationship between the plurality of specific regions from a plurality of 3D pointing positions acquired by the sensor-side device 10, and specifies one predetermined processing from the plurality of pieces of predetermined processing, based on a change of the calculated positional relationship between the plurality of specific regions and a plurality of pieces of status information. The plurality of pieces of predetermined processing include transfer processing, rotation processing, magnification processing, reduction processing, additional processing of display data of a functional menu, and the like.

For example, when the specific region of the user is one hand, the operation specification unit 35 specifies transfer processing of a distance corresponding to a rectilinear travel distance of the one hand while the one hand of the user maintains a specific status (the above-described predetermined shape) (for example, holding status). In addition, when the plurality of specific regions of the user are both hands, the operation specification unit 35 specifies magnification processing at a magnification ratio corresponding to an amount of change of a distance between the both hands in a state where the both hands of the user maintain a specific status (the above-described predetermined shape) (for example, holding status) with the position of one hand of the user used as a reference point. It is to be noted that the present exemplary embodiment does not limit predetermined processing itself specified by the operation specification unit 35.

The operation specification unit 35 stores IDs for identifying the above-described respective pieces of predetermined processing, and by selecting an ID corresponding to predetermined processing, the specification of the predetermined processing is achieved. The operation specification unit 35 passes the selected ID, the 3D pointing position in the 3D coordinate space, and the like to the object processing unit 36 to make the object processing unit 36 execute the predetermined processing.

The object processing unit 36 applies the predetermined processing specified by the operation specification unit 35 with respect to the virtual 3D object data generated by the virtual data generation unit 34. The object processing unit 36 is achieved so as to be able to execute the plurality of pieces of predetermined processing to be supported.

The image synthesis unit 37 synthesizes a virtual 3D object corresponding to the virtual 3D object data subjected to the predetermined processing by the object processing unit 36 with respect to the visual line image acquired by the visual line image acquisition unit 31, based on the position and the orientation of the HMD 9 calculated by the second standard setting unit 33 and the 3D coordinate space. It is to be noted that a well-known method used in augmented reality (AR) or the like may be used for synthesis processing by the image synthesis unit 37, and thus, the description is omitted here.

The display processing unit 38 displays a synthetic image obtained by the image synthesis unit 37 on the HMD 9. In the present exemplary embodiment, the two visual line images corresponding to the respective visual lines of the user are separately processed as described above, and thus, the display processing unit 38 separately displays synthetic images synthesized with the respective visual line images on the displays 9c and 9d of the HMD 9.

Figure 9:
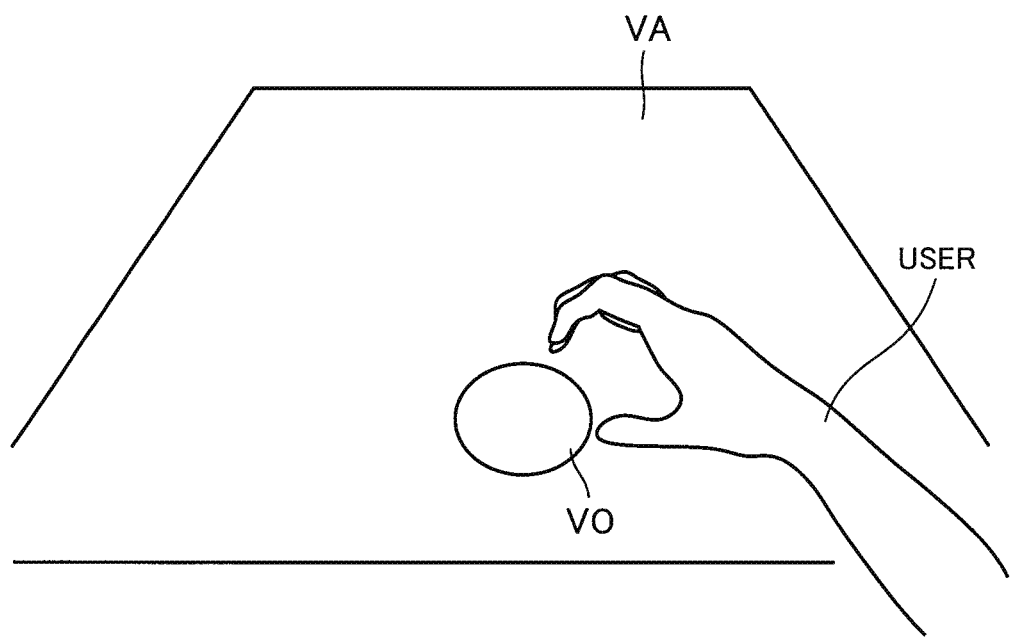
FIG. 9 is a diagram illustrating an example of a synthetic image displayed on the HMD.

FIG. 9 is a diagram illustrating an example of a synthetic image displayed on the HMD 9. The synthetic image illustrated in the example of FIG. 9 is composed of a spherical virtual 3D object VO and a visual line image including one hand of a user (including table VA). The user can freely operate the virtual 3D object included in the image by moving his/her own hand while seeing the image with the HMD 9.

Operation Example

Figure 10:
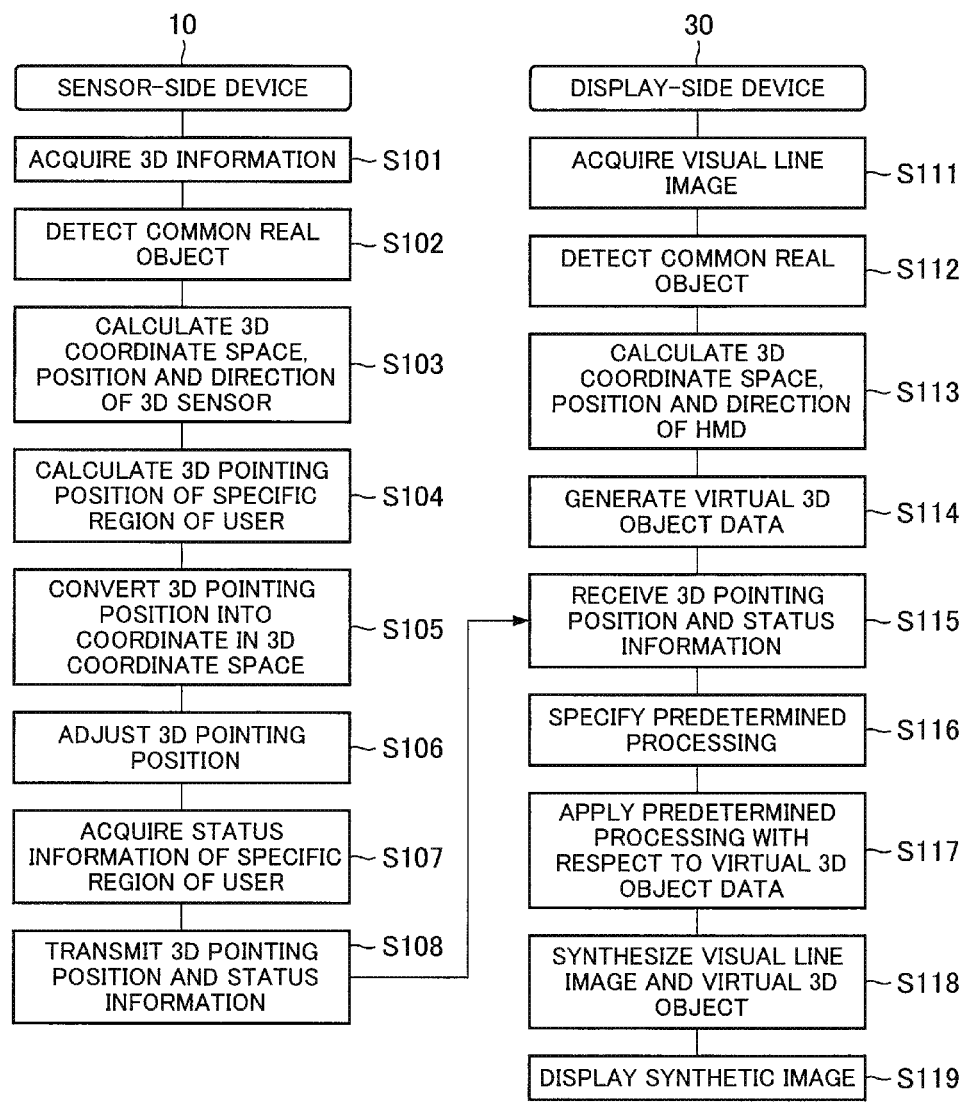
FIG. 10 is a sequence chart illustrating an operation example of the three-dimensional user interface device (3D-UI device) in the first exemplary embodiment.

Hereinafter, a user interface method in the first exemplary embodiment will be described using FIG. 10. FIG. 10 is a sequence chart illustrating an operation example of the 3D-UI device 1 in the first exemplary embodiment.

The sensor-side device 10 sequentially acquires 3D information from the 3D sensor 8 (S101). The sensor-side device 10 operates as follows, with respect to the 3D information having a predetermined frame rate.

The sensor-side device 10 detects a common real object from the 3D information (S102).

Subsequently, the sensor-side device 10 sets a 3D coordinate space based on the detected common real object, and calculates a position and an orientation of the 3D sensor 8 in the 3D coordinate space (S103).

Furthermore, the sensor-side device 10 calculates 3D pointing positions of a specific region of a user, using the 3D information (S104). Furthermore, the sensor-side device 10 converts the 3D pointing positions calculated at Step (S104) into 3D pointing positions in the 3D coordinate space set at Step (S103), based on the position and the orientation of the 3D sensor 8 calculated at Step (S103) and the 3D coordinate space (S105).

The sensor-side device 10 adjusts the 3D pointing positions converted at Step (S105) in response to a shape change of the specific region of the user (S106). The details of Step (S106) will be described below. Furthermore, the sensor-side device 10 specifies a status of the specific region and acquires status information, based on the shape of the specific region of the user (S107).

The sensor-side device 10 transmits the 3D pointing positions acquired at Step (S106) and the status information acquired at Step (S107), relating to the specific region of the user, to the display-side device 30 (S108).

On the other hand, the display-side device 30 is asynchronous with the acquisition of the 3D information (S101), and sequentially acquires visual line images from the HMD 9 (S111). The display-side device 30 operates as follows, with respect to the visual line image having a predetermined frame rate.

The display-side device 30 detects a common real object from the visual line image (S112). Subsequently, the display-side device 30 sets a 3D coordinate space based on the detected common real object, and calculates a position and an orientation of the HMD 9 in the 3D coordinate space (S113).

The display-side device 30 generates virtual 3D object data arranged in the set 3D coordinate space (S114).

When receiving the 3D pointing position and the status information relating to the specific region of the user from the sensor-side device 10 (S115), the display-side device 30 specifies predetermined processing corresponding to a user's gesture in response to a combination of a change of the 3D pointing position and the status information of the specific region (S116). When there are a plurality of specific regions, the display-side device 30 specifies predetermined processing in response to a combination of a change of a positional relationship between the plurality of specific regions and a plurality of pieces of status information.

The display-side device 30 applies the predetermined processing specified at Step (S116) with respect to the virtual 3D object data generated at Step (S114). Subsequently, the display-side device 30 synthesizes a virtual 3D object corresponding to the virtual 3D object data subjected to the predetermined processing and the visual line image (S118) to generate display data.

The display-side device 30 displays the image obtained by the synthesis on the HMD 9 (S119).

In FIG. 10, the example in which the acquisition of the 3D information (S101) and the acquisition of the status information (S107) are sequentially executed is illustrated for the purpose of illustration, but when the status information of the specific region is obtained from other than the 3D information, Steps (S101) and (S107) are executed in parallel. In addition, in FIG. 10, the example in which Steps (S102) and (S103) are executed at a predetermined frame rate of the 3D information is illustrated, but Steps (S102) and (S103) may be executed only at calibration.

In FIG. 10, the example in which processing with respect to information regarding the specific region of the user transmitted from the sensor-side device 10 (Step (S115) to Step (S117)) and generation processing of the virtual 3D object data (Step (S112) to Step (S114)) are sequentially executed is illustrated for the purpose of illustration. However, Step (S115) to Step (S117) and Step (S112) to Step (S114) are executed in parallel.

Figure 11:
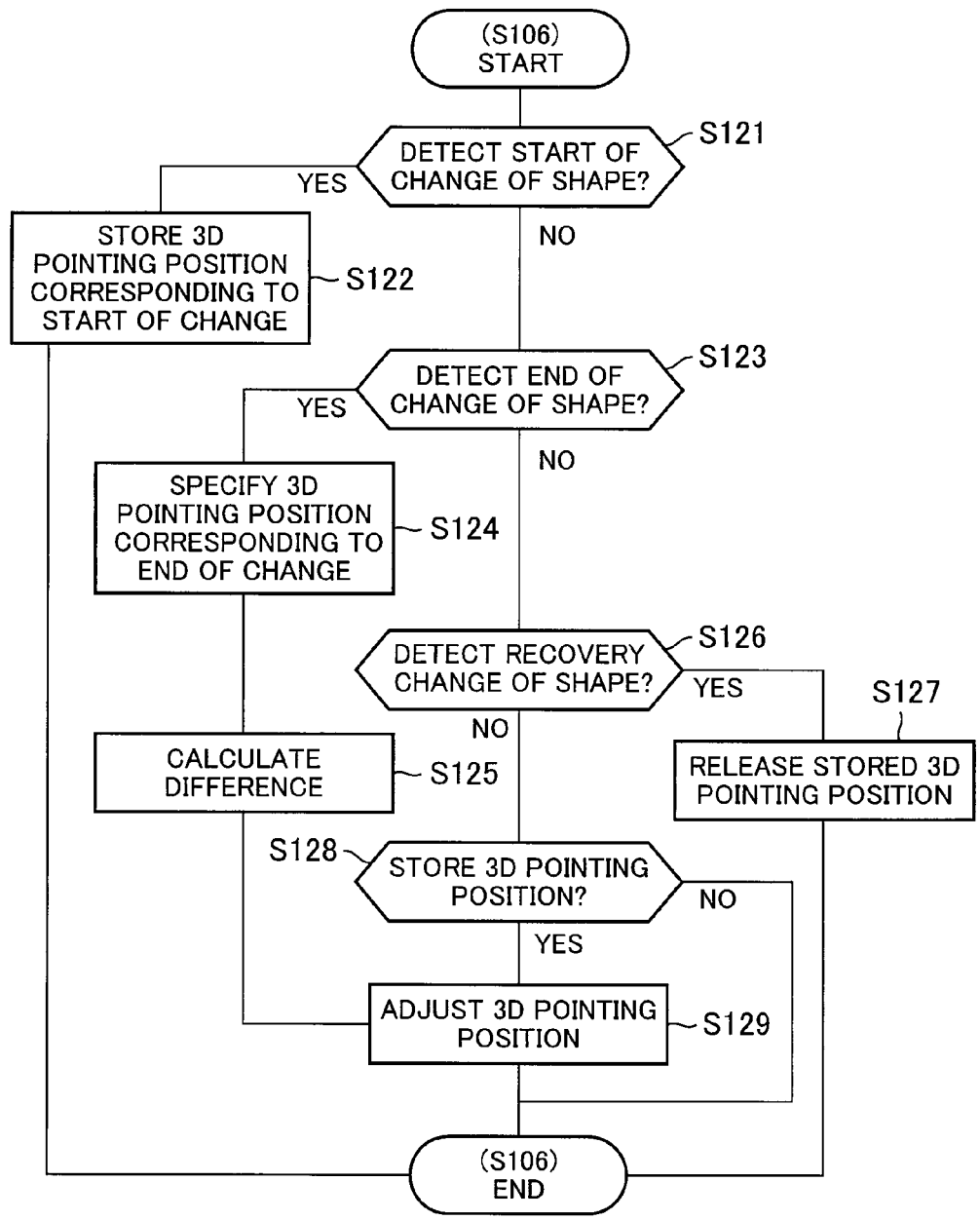
FIG. 11 is a flowchart illustrating the details of Step (S106) illustrated in FIG. 10.

FIG. 11 is a flowchart illustrating the details of Step (S106) illustrated in FIG. 10.

The sensor-side device 10 detects the start of the change, the end of the change, or the recovery change regarding the shape of the specific region of the user. When detecting the start of the change of the shape of the specific region of the user (S121; YES), the sensor-side device 10 stores a 3D pointing position corresponding to the time of the start of the change among the 3D pointing positions converted at Step (S105) of FIG. 10 (S122).

When detecting the end of the change of the shape of the specific region of the user (S121; NO, S123; YES), the sensor-side device 10 specifies a 3D pointing position corresponding to the time of the end of the change among the 3D pointing positions converted at Step (S105) of FIG. 10 (S124). Subsequently, the sensor-side device 10 calculates a difference between the 3D pointing position corresponding to the time of the end of the change and the 3D pointing position stored at Step (S122) (S125). The sensor-side device 10 adjusts the 3D pointing position corresponding to the time of the end of the change, using the calculated difference (S129).

In addition, when detecting the recovery change of the shape of the specific region of the user (S121; NO, S123; NO, S126; YES), the sensor-side device 10 releases the 3D pointing position stored at Step (S122).

When any of the start of the change, the end of the change, and the recovery change regarding the shape of the specific region of the user is not detected (S121; NO, S123; NO, S126; NO), the sensor-side device 10 determines whether or not the 3D pointing position is stored (S128). When the 3D pointing position is stored (S128; YES), the sensor-side device 10 adjusts the 3D pointing positions converted at Step (S105) of FIG. 10, using the difference calculated at Step (S125). Accordingly, while the shape of the specific region of the user maintains at least the shape at the time of the end of the change, the 3D pointing positions are adjusted.

On the other hand, when the 3D pointing position is not stored (S128; NO), the sensor-side device 10 directly uses the 3D pointing positions converted at Step (S105) of FIG. 10 without adjusting them.

Function and Effect of First Exemplary Embodiment

As described above, in the first exemplary embodiment, the visual line image of the user, in which the specific region (hand or the like) used in a pointing operation is photographed, is acquired, and the image obtained by synthesizing the virtual 3D object in the visual line image is displayed in the user's view by the video see-through method. Furthermore, in the first exemplary embodiment, the change of the 3D pointing position of the specific region of the user and the status information relating to the shape of the specific region are acquired, and the predetermined processing specified from the combination thereof is applied with respect to the virtual 3D object. Therefore, according to the first exemplary embodiment, the user can feel as if he/she operated the virtual 3D object by his/her own specific region. More specifically, according to the first exemplary embodiment, an intuitive operational feeling for the virtual 3D object can be provided to the user.

In the first exemplary embodiment, the pointing position after the time of the end of the change is adjusted, using the misalignment of the pointing positions corresponding to the specific region before and after the change of the shape of the specific region of the user used in a pointing operation. Furthermore, in the first exemplary embodiment, when the recovery change of the shape is detected after detecting the end of the change, the stored 3D pointing position is released, and after the release, the adjustment of the 3D pointing position is not performed. For example, during the process of changing from the hand-holding status (the above-described predetermined shape) to the hand-opening status. This is because the misalignment of the pointing positions corresponding to the specific region is resolved, and the position adjustment becomes unnecessary.

Therefore, according to the present exemplary embodiment, the resolution of the misalignment of the pointing positions before and after the specific gesture and the stop of the further position adjustment associated with the shape change of the specific region can make the pointing operation of the user be an operation that is further intuitively recognized. However, such a function effect is not produced in a limited way in a form in which the specific region of the user is photographed in the visual line image and the virtual 3D object to be an operation object is synthesized. This is because the user may operate the operation object by his/her own specific region without viewing the operation object. Even in such a case, according to the first exemplary embodiment, the misalignment of the pointing positions corresponding to the specific region can be similarly resolved.

Second Exemplary Embodiment

In the above-described first exemplary embodiment, the HMD 9 is used, and the form that enables the operation of the virtual 3D object by the movement of the specific region of the user photographed in the user's visual line image is illustrated. However, the present invention can be applied to a form that enables the operation of the virtual 3D object by the movement of the specific region of the user photographed in not the user's visual line image but a user image photographed from the opposite side. This is because the misalignment of the pointing positions before and after the specific gesture may occur in such a form. Hereinafter, regarding the 3D-UI device 1 in the second exemplary embodiment, the contents different from those in the first exemplary embodiment will be mainly described. In the following description, the same contents as the first exemplary embodiment will be properly omitted.

The 3D-UI device 1 in the second exemplary embodiment includes only the sensor-side device 10, and displays the synthetic image on a display part connected to the input-output I/F 5 of the sensor-side device 10.

Figure 12:
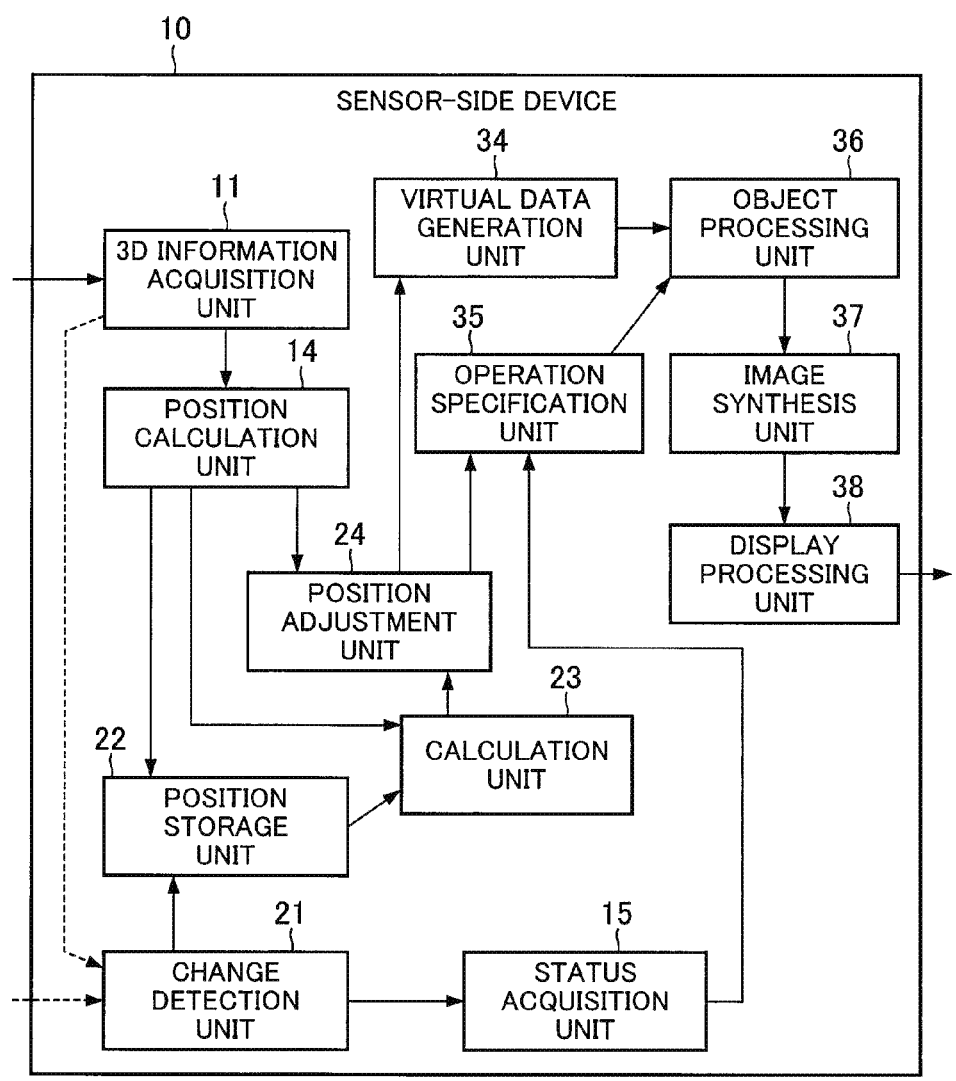
FIG. 12 is a diagram conceptually illustrating a functional configuration example of the three-dimensional user interface device (3D-UI device) in a second exemplary embodiment.

FIG. 12 is a diagram conceptually illustrating a functional configuration example of the 3D-UI device 1 in the second exemplary embodiment. The functional configuration of the 3D-UI device 1 in the second exemplary embodiment is different from that in the first exemplary embodiment in that the first object detection unit 12, the first standard setting unit 13, the position calculation unit 14, the transmission unit 16, the visual line image acquisition unit 31, the second object detection unit 32, and the second standard setting unit 33 are removed. In addition, the second exemplary embodiment is different from the first exemplary embodiment in that the processing is performed based on the 3D pointing position corresponding to the camera coordinate system of the 3D sensor 8.

According to the second exemplary embodiment, by moving his/her own specific region on a video while seeing his/her own video photographed from the opposite side, which is displayed on the display part of the sensor-side device 10, the user can operate the virtual 3D object photographed in the video. In the sensor-side device 10 in the second exemplary embodiment, a pseudo user image may be displayed in place of the user image.

Also in the second exemplary embodiment, the misalignment of the pointing positions before and after the specific gesture occurs, and the misalignment can be resolved by the position adjustment using the difference between the 3D pointing position corresponding to the time of the end of the change and the stored 3D pointing position corresponding to the time of the start of the change.

Third Exemplary Embodiment

In the above-described second exemplary embodiment, the positions of the specific region of the user used in a pointing operation are specified by the three-dimensional coordinate system, but may be specified by a two-dimensional coordinate system (the third exemplary embodiment). The sensor-side device 10 in the third exemplary embodiment includes a 2D sensor such as a 2D image imaging device and an infrared sensor, in place of the 3D sensor 8. The 3D information acquisition unit 11 is changed to a 2D information acquisition unit, and the 2D information acquisition unit acquires 2D information that is obtained from the 2D sensor and can specify the specific region of the user. Accordingly, the position calculation unit 14 sequentially calculates 2D pointing positions of the specific region of the user, and the 2D pointing positions are adjusted in association with the shape change of the specific region.

The virtual data generation unit 34 should just generate 2D virtual object data. In the third exemplary embodiment, the 2D information needs not to include an image of the specific region of the user. In this case, the sensor-side device 10 needs not to include the image synthesis unit 37, and displays the 2D virtual object data subjected to predetermined processing on a display part.

Also in the foregoing third exemplary embodiment, the misalignment of the 2D pointing positions before and after the specific gesture may occur. The misalignment can be resolved by the position adjustment using the difference between the 2D pointing position corresponding to the time of the end of the change and the stored 2D pointing position corresponding to the time of the start of the change.

Modified Examples

In the above-described first exemplary embodiment, the 3D pointing positions converted from the camera coordinate system into the 3D coordinate system set based on the common real object are adjusted, but the 3D pointing positions of the camera coordinate system before conversion may be adjusted. In this case, the adjusted 3D pointing positions are converted into the 3D coordinate system set based on the common real object. In this case, Step (S106) of FIG. 10 is executed after Step (S104) and before Step (S105).

In addition, the adjustment of the 3D pointing positions or the 2D pointing positions in the above-described respective exemplary embodiments may be further performed as follows. For example, the change detection unit 21 measures time required for the change from when the start of the change is detected till when the end of the change is detected, the position storage unit 22 releases the stored pointing position when the measured time required for the change is larger than a predetermined threshold value, and the position adjustment unit 24 stops the adjustment of the pointing positions in response to the release of the pointing position by the position storage unit 22. As another example, the position storage unit 22 releases the stored pointing position when the difference calculated by the calculation unit 23 is larger than a predetermined threshold value, and the position adjustment unit 24 stops the adjustment of the pointing positions in response to the release of the pointing position by the position storage unit 22.

Accordingly, when time between the start of the change of the shape in the specific region of the user and the end of the change into the predetermined shape is longer than that at ordinary times, and when the position of the specific region of the user is greatly moved between the start of the change of the shape and the end of the change into the predetermined shape, compared to ordinary times, the adjustment of the pointing positions can be prevented from being performed. Accordingly, when the user unintentionally changes the shape of his/her own specific region, when the user unintentionally changes the shape of the specific region together with an unexpected movement, and the like, the movement can be prevented from being recognized as an input of a computer. Therefore, according to the modified examples, the computer can be prevented from being operated by the movement which the user does not intend, and thus, an intuitive and simple computer operation for the user can be achieved.

Although a plurality of steps (pieces of processing) are described in order in a plurality of flow charts used in the above-described description, the execution order of the steps executed in the present exemplary embodiment is not limited to the described order. In the present exemplary embodiment, the order of the illustrated steps can be changed in a range without interfering the contents. In addition, the above-described respective exemplary embodiments and respective modified examples can be combined in a range without contradicting the contents.

A part or all of the above-described respective exemplary embodiments and respective modified examples can be specified as the following modes. However, the respective exemplary embodiments and the respective modified examples are not limited to the following description.

(Mode 1)

A user interface device including:
- a position acquisition unit that sequentially acquires pointing positions indicating at least one representative position of a specific region of a user used in a pointing operation;
- a change detection unit that detects the start of a change and the end of the change into a predetermined shape of the specific region of the user;
- a position storage unit that stores a pointing position corresponding to the time of the start of the change detected by the change detection unit among the pointing positions sequentially acquired by the position acquisition unit;
- a calculation unit that specifies a pointing position corresponding to the time of the end of the change detected by the change detection unit among the pointing positions acquired by the position acquisition unit and calculates a difference between the specified pointing position and the pointing position stored in the position storage unit; and
- a position adjustment unit that adjusts the pointing positions acquired by the position acquisition unit using the difference calculated by the calculation unit.

(Mode 2)

The user interface device according to mode 1,
wherein the change detection unit detects a recovery change of a shape of the specific region of the user, from the predetermined shape to a recovery direction,
the position storage unit releases the stored pointing position in response to the detection of the recovery change by the change detection unit, and
the position adjustment unit stops the adjustment of the pointing positions acquired by the position acquisition unit in response to the release of the pointing position by the position storage unit.

(Mode 3)

The user interface device according to mode 1 or 2,
wherein the change detection unit measures time required for the change from when the start of the change is detected till when the end of the change is detected,
the position storage unit releases the stored pointing position when the time required for the change is larger than a predetermined threshold value, and
the position adjustment unit stops the adjustment of the pointing positions acquired by the position acquisition unit in response to the release of the pointing position by the position storage unit.

(Mode 4)

The user interface device according to any one of modes 1 to 3,
wherein the position storage unit releases the stored pointing position when the difference calculated by the calculation unit is larger than a predetermined threshold value, and
the position adjustment unit stops the adjustment of the pointing positions acquired by the position acquisition unit in response to the release of the pointing position by the position storage unit.

(Mode 5)

A user interface method executed by at least one computer, including:
- sequentially acquiring pointing positions indicating at least one representative position of a specific region of a user used in a pointing operation;
- detecting the start of a change and the end of the change into a predetermined shape of the specific region of the user;
- storing a pointing position corresponding to the time of the detected start of the change among the sequentially acquired pointing positions;
- specifying a pointing position corresponding to the time of the detected end of the change among the acquired pointing positions;
- calculating a difference between the specified pointing position and the stored pointing position; and
- adjusting the acquired pointing positions using the calculated difference.

(Mode 6)

The user interface method according to mode 5, further including:
- detecting a recovery change of a shape of the specific region of the user, from the predetermined shape to a recovery direction;
- releasing the stored pointing position in response to the detection of the recovery change by the change detection unit; and
- stopping the adjustment of the pointing positions in response to the release of the pointing position.

(Mode 7)

The user interface method according to mode 5 or 6, further including:
- measuring time required for the change from when the start of the change is detected till when the end of the change is detected;
- releasing the stored pointing position when the time required for the change is larger than a predetermined threshold value; and
- stopping the adjustment of the acquired pointing positions in response to the release of the pointing position.

(Mode 8)

The user interface method according to any one of modes 5 to 7, further including:
- releasing the stored pointing position when the calculated difference is larger than a predetermined threshold value; and
- stopping the adjustment of the acquired pointing positions in response to the release of the pointing position.

(Mode 9)

A program that makes at least one computer execute a user interface method, the user interface method including:
- sequentially acquiring pointing positions indicating at least one representative position of a specific region of a user used in a pointing operation;
- detecting the start of a change and the end of the change into a predetermined shape of the specific region of the user;
- storing a pointing position corresponding to the time of the detected start of the change among the sequentially acquired pointing positions;

specifying a pointing position corresponding to the time of the detected end of the change among the acquired pointing positions;

calculating a difference between the specified pointing position and the stored pointing position; and adjusting the acquired pointing positions using the calculated difference.

(Mode 10)

The program according to mode 9, wherein the user interface method further includes:

detecting a recovery change of a shape of the specific region of the user, from the predetermined shape to a recovery direction;

releasing the stored pointing position in response to the detection of the recovery change by the change detection unit; and stopping the adjustment of the pointing positions in response to the release of the pointing position.

(Mode 11)

The program according to mode 9 or 10, wherein the user interface method further includes:

measuring time required for the change from when the start of the change is detected till when the end of the change is detected;

releasing the stored pointing position when the time required for the change is larger than a predetermined threshold value; and stopping the adjustment of the acquired pointing positions in response to the release of the pointing position.

(Mode 12)

The program according to any one of modes 9 to 11, wherein the user interface method further includes:

releasing the stored pointing position when the calculated difference is larger than a predetermined threshold value; and stopping the adjustment of the acquired pointing positions in response to the release of the pointing position.

(Mode 13)

A computer-readable recording medium that records the program according to any one of modes 9 to 12.

This application claims priority to Japanese Patent Application No. 2012-222884 filed on Oct. 5, 2012, the entire contents of which are incorporated by reference herein.

What is claimed is:

1. A user interface device comprising:

a position acquisition unit that sequentially acquires, by using an image of a user and depth information representing a depth direction in a 3-D coordinate space from a 3-D sensor, pointing positions indicating at least one representative position of a specific region of a user used in a pointing operation;

a change detection unit that detects the start of a change and the end of the change into a predetermined shape of the specific region of the user;

a position storage unit that stores a pointing position corresponding to the time of the start of the change detected by the change detection unit among the pointing positions sequentially acquired by the position acquisition unit;

a calculation unit that specifies a pointing position corresponding to the time of the end of the change detected by the change detection unit among the pointing positions acquired by the position acquisition unit and calculates a distance between the specified pointing position and the pointing position stored in the position storage unit in an axis parallel to the depth direction of the 3-D sensor in the 3-D coordinate space as a difference between the specified pointing position and the pointing position stored in the position storage unit; and a position adjustment unit that adjusts the pointing positions acquired by the position acquisition unit using the difference calculated by the calculation unit.

2. The user interface device according to claim 1, wherein the change detection unit detects a recovery change of a shape of the specific region of the user, from the predetermined shape to a recovery direction, the position storage unit releases the stored pointing position in response to the detection of the recovery change by the change detection unit, and the position adjustment unit stops the adjustment of the pointing positions acquired by the position acquisition unit in response to the release of the pointing position by the position storage unit.

3. The user interface device according to claim 1, wherein the change detection unit measures time required for the change from when the start of the change is detected till when the end of the change is detected, the position storage unit releases the stored pointing position when the time required for the change is larger than a predetermined threshold value, and the position adjustment unit stops the adjustment of the pointing positions acquired by the position acquisition unit in response to the release of the pointing position by the position storage unit.

4. The user interface device according to claim 1, wherein the position storage unit releases the stored pointing position when the difference calculated by the calculation unit is larger than a predetermined threshold value, and the position adjustment unit stops the adjustment of the pointing positions acquired by the position acquisition unit in response to the release of the pointing position by the position storage unit.

5. A user interface method by at least one computer, comprising:

sequentially acquiring, by using an image of a user and depth information representing a depth direction in a 3-D coordinate space from a 3-D sensor, pointing positions indicating at least one representative position of a specific region of a user used in a pointing operation;

detecting the start of a change and the end of the change into a predetermined shape of the specific region of the user;

storing a pointing position corresponding to the time of the detected start of the change among the sequentially acquired pointing positions;

specifying a pointing position corresponding to the time of the detected end of the change among the acquired pointing positions;

calculating a distance between the specified pointing position and the pointing position stored in the position storage unit in an axis parallel to the depth direction of the 3-D sensor in the 3-D coordinate space as a difference between the specified pointing position and the stored pointing position; and adjusting the acquired pointing positions using the calculated difference.

6. The user interface method by the at least one computer, according to claim 5, further comprising:

detecting a recovery change of a shape of the specific region of the user, from the predetermined shape to a recovery direction;

releasing the stored pointing position in response to the detection of the recovery change by the change detection unit; and stopping the adjustment of the pointing positions in response to the release of the pointing position.

7. The user interface method by the at least one computer, according to claim 5, further comprising:

measuring time required for the change from when the start of the change is detected till when the end of the change is detected;

releasing the stored pointing position when the time required for the change is larger than a predetermined threshold value; and stopping the adjustment of the acquired pointing positions in response to the release of the pointing position.

8. The user interface method by the at least one computer, according to claim 5, further comprising:

releasing the stored pointing position when the calculated difference is larger than a predetermined threshold value; and stopping the adjustment of the acquired pointing positions in response to the release of the pointing position.

9. A non-transitory computer readable medium program that causes a computer serving as an information processing device storing a program for causing a computer to execute a process to:

sequentially acquire, by using an image of a user and depth information representing a depth direction in a 3-D coordinate space from a 3-D sensor, pointing positions indicating at least one representative position of a specific region of a user used in a pointing operation;

detect the start of a change and the end of the change into a predetermined shape of the specific region of the user;

store a pointing position corresponding to the time of the detected start of the change among the sequentially acquired pointing positions;

specify a pointing position corresponding to the time of the detected end of the change among the acquired pointing positions;

calculate a distance between the specified pointing position and the pointing position stored in the position storage unit in an axis parallel to the depth direction of the 3-D sensor in the 3-D coordinate space as a difference between the specified pointing position and the stored pointing position; and adjust the acquired pointing positions using the calculated difference.

\* \* \* \* \*